United States Patent
Saito (10) Patent No.: US 11,480,776 B2
(45) Date of Patent: Oct. 25, 2022

(54) ZOOM LENS AND IMAGING APPARATUS HAVING THE SAME

(71) Applicant: CANON KABUSHIKI KAISHA, Tokyo (JP)

(72) Inventor: Shinichiro Saito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 327 days.

(21) Appl. No.: 16/824,164

(22) Filed: Mar. 19, 2020

(65) Prior Publication Data

US 2020/0310088 A1    Oct. 1, 2020

(30) Foreign Application Priority Data

Mar. 29, 2019 (JP) .............. JP2019-066984
Dec. 17, 2019 (JP) .............. JP2019-227718

(51) Int. Cl.
- *G02B 15/177* (2006.01)
- *G02B 15/20* (2006.01)
- *G02B 13/00* (2006.01)
- *G02B 27/00* (2006.01)
- *H04N 5/232* (2006.01)

(52) U.S. Cl.
CPC ......... *G02B 15/177* (2013.01); *G02B 13/009* (2013.01); *G02B 15/20* (2013.01); *G02B 27/0025* (2013.01); *H04N 5/23296* (2013.01)

(58) Field of Classification Search
CPC ............ H04N 5/23296; G02B 27/0025; G02B 15/20; G02B 13/009; G02B 15/177
USPC ................................. 359/676, 683
See application file for complete search history.

(56) References Cited

U.S. PATENT DOCUMENTS

| | | |
|---|---|---|
| 2014/0118603 A1 | 5/2014 | Saito |
| 2015/0054988 A1* | 2/2015 | Kimura .............. G02B 15/1425 359/680 |
| 2017/0199361 A1* | 7/2017 | Oe ..................... G02B 13/0095 |
| 2018/0164558 A1 | 6/2018 | Saito |
| 2019/0041605 A1 | 2/2019 | Saito et al. |
| 2019/0041606 A1 | 2/2019 | Saito et al. |
| 2020/0103647 A1 | 4/2020 | Saito |

FOREIGN PATENT DOCUMENTS

| | | |
|---|---|---|
| CN | 104423023 A | 3/2015 |
| JP | 2017068114 A | 4/2017 |

OTHER PUBLICATIONS

Notification of the First Office Action issued by the China National Intellectual Property Administration dated Oct. 9, 2021 in corresponding CN Patent Application No. 202010212447.0, with English translation.

* cited by examiner

*Primary Examiner* — James R Greece
(74) *Attorney, Agent, or Firm* — Carter, DeLuca & Farrell LLP (57) ABSTRACT

A zoom lens includes, in order from an object side to an image side, a first lens unit having a negative refractive power, and a rear group having a positive refractive power as a whole including at least one lens unit. During zooming from a wide-angle end to a telephoto end, a distance between adjacent lens units changes. The first lens unit includes at least three negative single lenses, and a predetermined condition is satisfied.

19 Claims, 9 Drawing Sheets

ZOOM LENS AND IMAGING APPARATUS HAVING THE SAME

BACKGROUND OF THE INVENTION

Field of the Invention

The present invention relates generally to a zoom lens and an imaging apparatus (image pickup apparatus) having the same, and more particularly to the zoom lens suitable for an imaging apparatus such as a digital still camera, a video camera, a surveillance camera, and an in-vehicle camera.

Description of the Related Art

An imaging apparatus such as a digital still camera and a video camera, has recently used the increased number of pixels of a solid-state image sensor such as a CCD sensor and a CMOS sensor, and a zoom lens used for the imaging apparatus is demanded for high optical performance.

Japanese Patent Laid-Open No. ("JP") 2017-68114 discloses a fisheye zoom lens that can obtain good optical performance with a predetermined magnification variation ratio while securing a backfocus in the shortest focal length state.

It is effective for a super wide-angle lens to be a retrofocus type having a configuration in which a lens unit having a negative refractive power is disposed on the object side and a lens unit having a positive refractive power is disposed on the image side but in this case, it becomes necessary to properly correct a lateral chromatic aberration and a field curvature. Hence, a configuration of the lens unit having the negative refractive power which is disposed on the object side is important for the super wide-angle lens. In order to make compact and lightweight the lens, it is important to properly set the optical arrangement, the refractive power, the dispersion characteristic, and the like of each lens unit.

SUMMARY OF THE INVENTION

The present invention provides a zoom lens and an imaging apparatus that have a wide angle of view, a small size, and a high optical performance.

A zoom lens according to one aspect of the present invention includes, in order from an object side to an image side, a first lens unit having a negative refractive power, and a rear group having a positive refractive power as a whole including at least one lens unit. During zooming from a wide-angle end to a telephoto end, a distance between adjacent lens units changes. The first lens unit includes at least three negative single lenses. When the following conditional expressions are satisfied:

$$1.93 < |f1|/fw < 6.50$$

$$0.10 < fG1N/f1 < 2.00$$

where f1 is a focal length of the first lens unit, fw is a focal length of the zoom lens at the wide-angle end, and fG1N is a focal length of a negative lens G1N closest to the object side in the first lens unit.

An imaging apparatus including the above zoom lens also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

A zoom lens according to each embodiment includes, in order from the object side to the image side, a first lens unit L1 having a negative refractive power (optical power=reciprocal of the focal length) and a rear group LR having a wholly positive refractive power including at least one lens unit. Further, in the zoom lens according to each embodiment, a distance between the first lens unit L1 and the rear group LR (or an interval between adjacent lens units) changes during zooming from the wide-angle end to the telephoto end.

Figure 1:
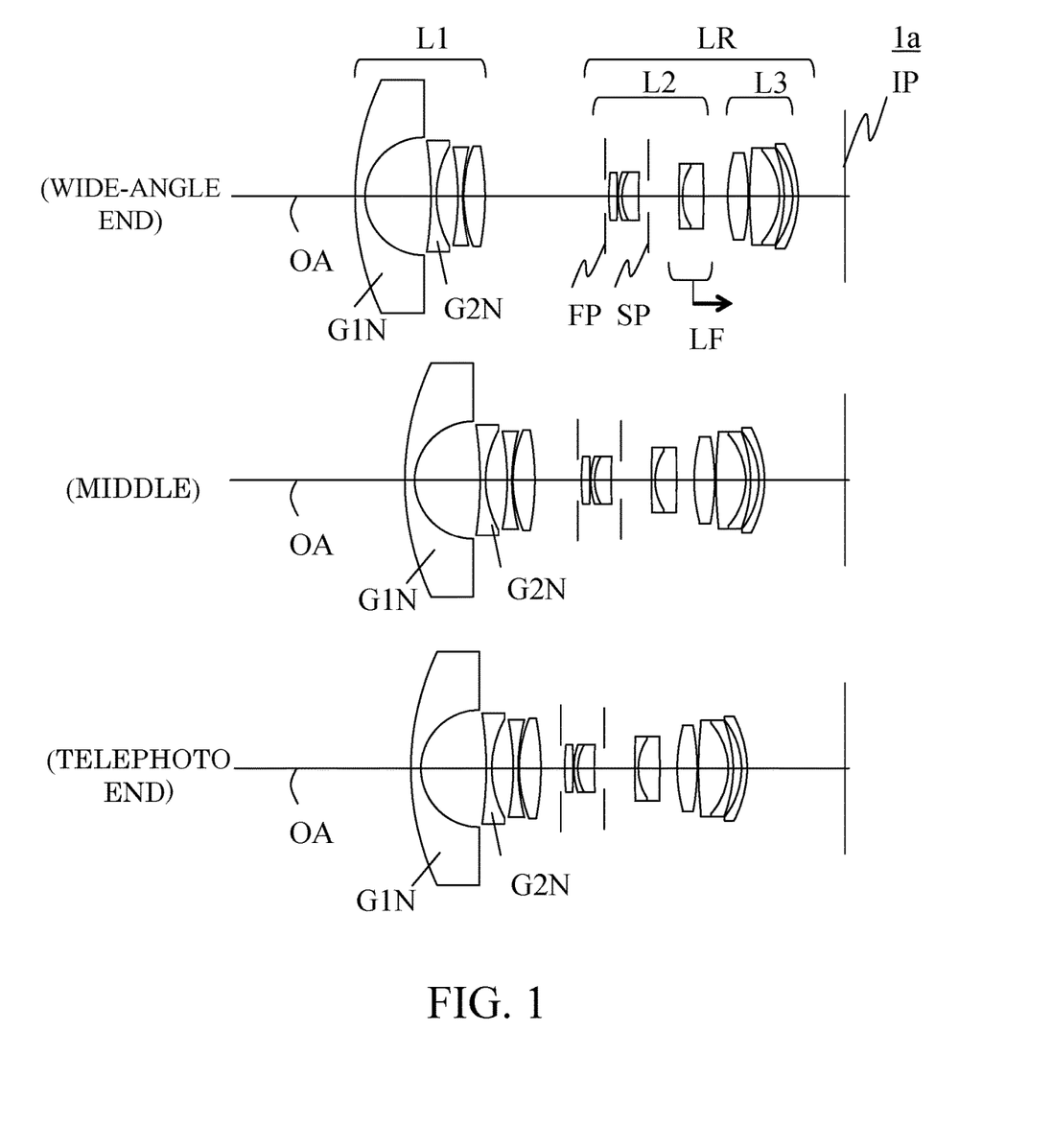
FIG. 1 is a lens sectional view of a zoom lens according to a first embodiment at a wide-angle end, an intermediate zoom position, and a telephoto end.
Figure 2A:
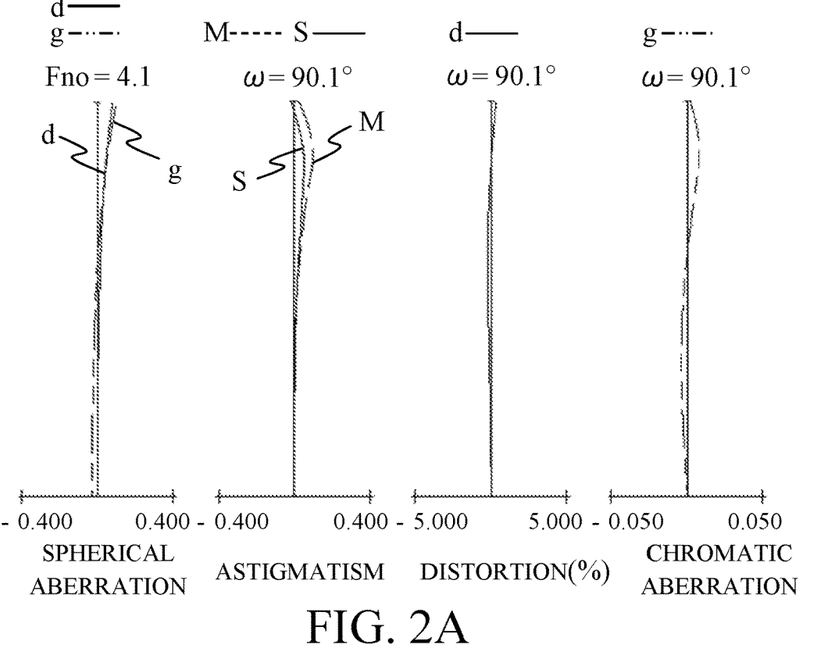
FIG. 2A is an aberration diagram of the zoom lens according to the first embodiment at the wide-angle end.
Figure 2B:
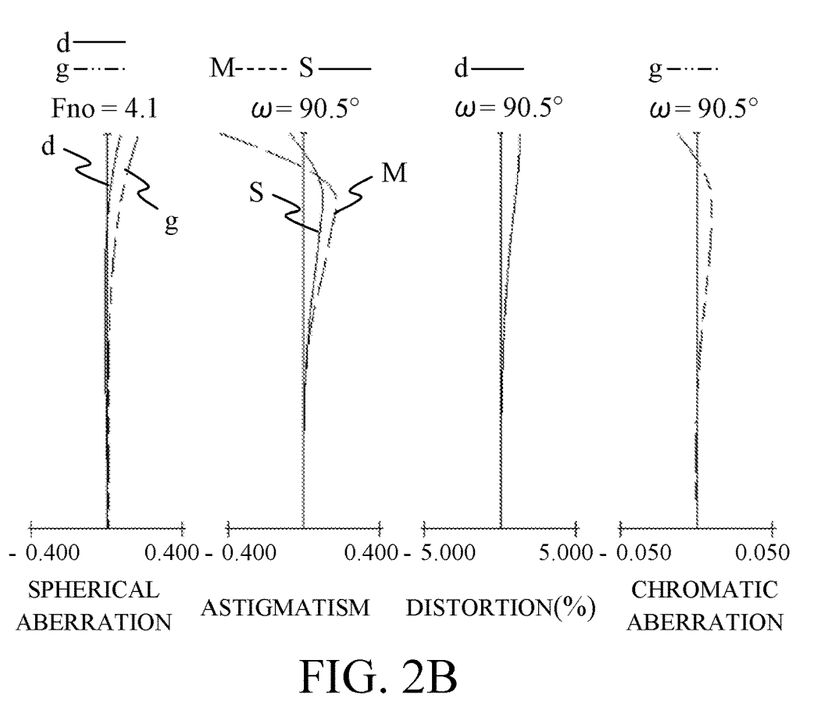
FIG. 2B is an aberration diagram of the zoom lens in the first embodiment at the intermediate zoom position.
Figure 2C:
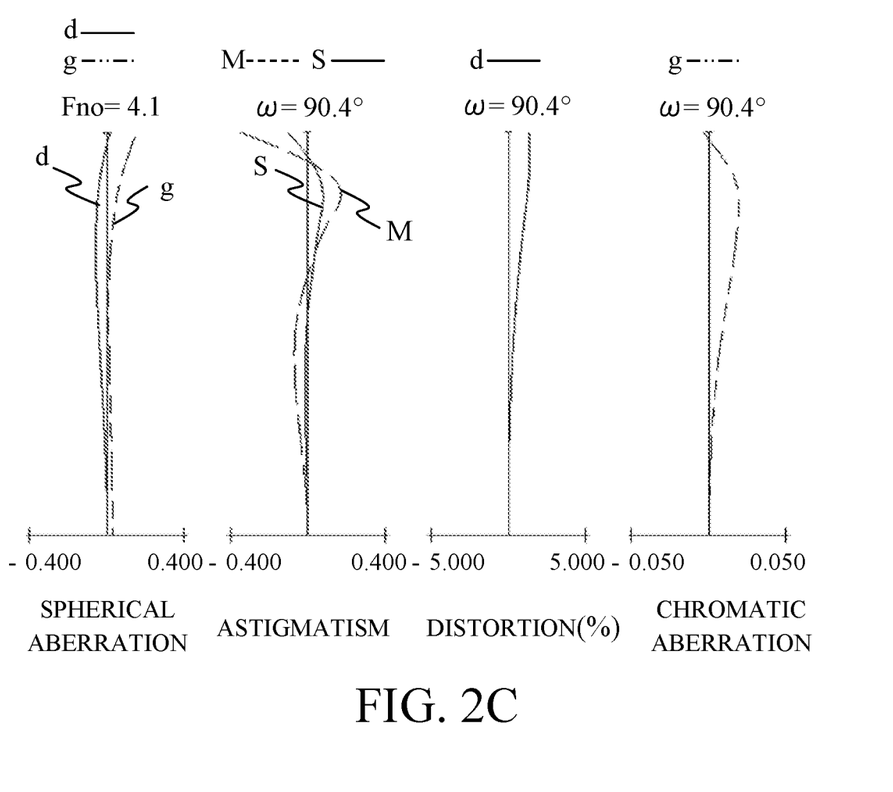
FIG. 2C is an aberration diagram of the zoom lens according to the first embodiment at the telephoto end.

FIG. 1 is a lens sectional view of a zoom lens 1a according to the first embodiment of the present invention at a wide-angle end (short focal length end), a middle or intermediate zoom position, and a telephoto end (long focal length end) when an object at infinity is focused. FIGS. 2A, 2B, and 2C are aberration diagrams of the zoom lens 1a at the wide-angle end, the intermediate zoom position, and the telephoto end, respectively, when an object at infinity is focused. The zoom lens 1a is a zoom lens having a zoom ratio of about 1.85 and an aperture ratio of about 4.1.

Figure 3:
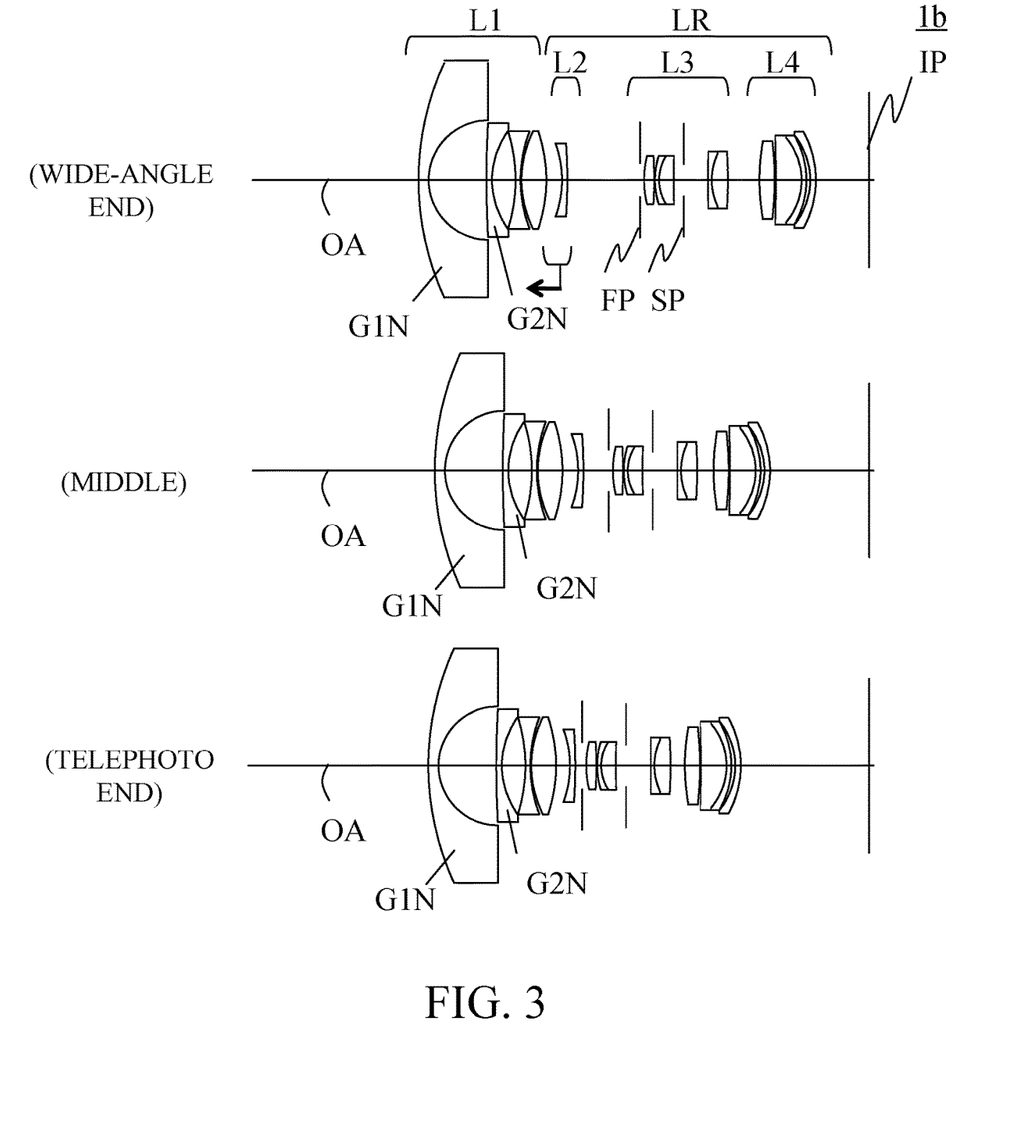
FIG. 3 is a sectional view of a zoom lens at a wide-angle end, an intermediate zoom position, and a telephoto end according to a second embodiment.
Figure 4A:
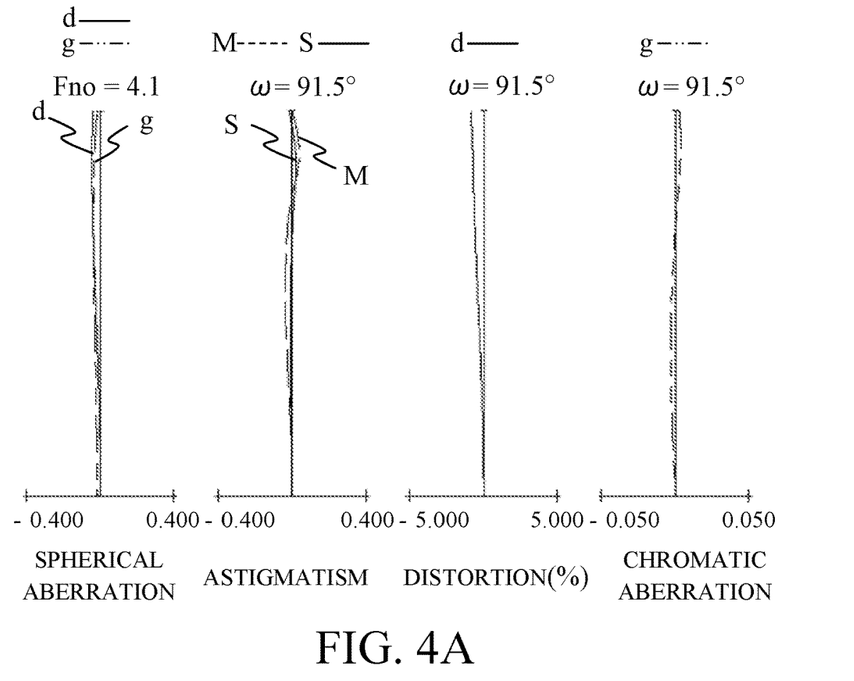
FIG. 4A is an aberration diagram of the zoom lens according to the second embodiment at the wide-angle end.
Figure 4B:
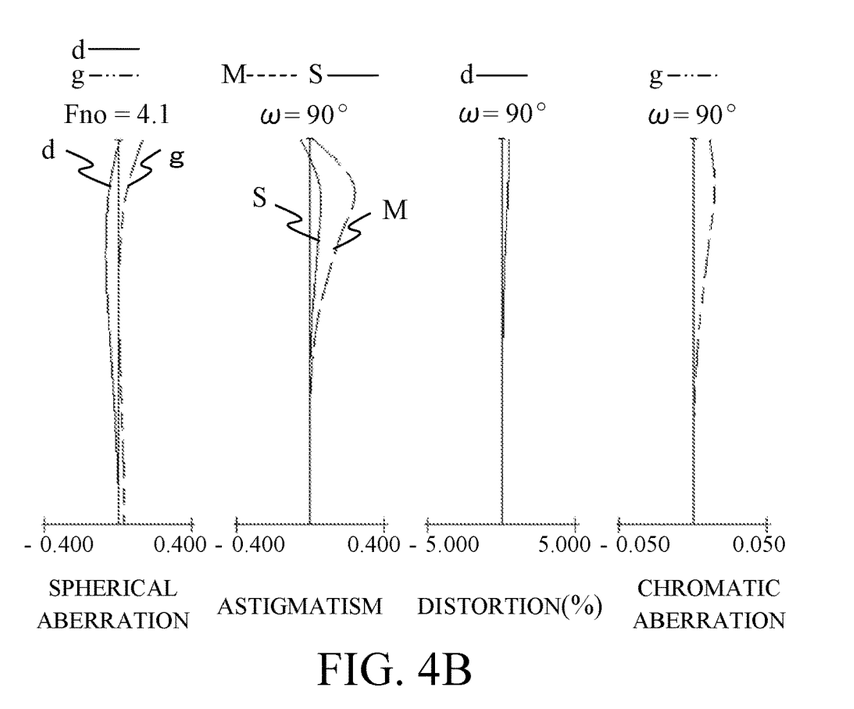
FIG. 4B is an aberration diagram of the zoom lens in the second embodiment at the intermediate zoom position.
Figure 4C:
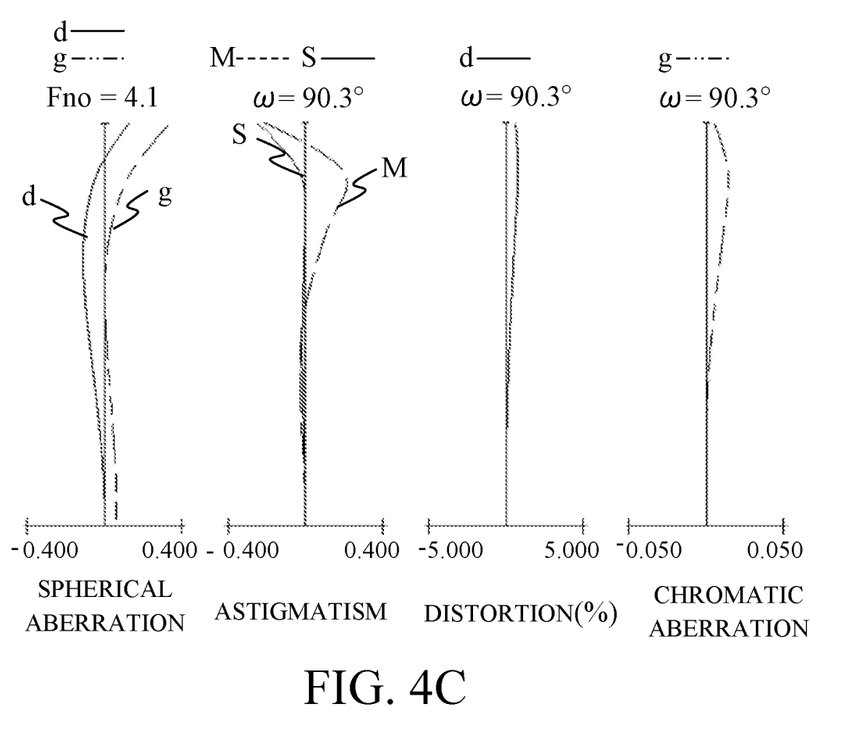
FIG. 4C is an aberration diagram of the zoom lens according to the second embodiment at the telephoto end.

FIG. 3 is a sectional view of the zoom lens 1b according to the second embodiment of the present invention at the wide-angle end, the intermediate zoom position, and the telephoto end when the object at infinity is focused. FIGS. 4A, 4B, and 4C are aberration diagrams of the zoom lens 1b at the wide-angle end, the intermediate zoom position, and the telephoto end, respectively, when the object at infinity is focused. The zoom lens 1b is a zoom lens having a zoom ratio of about 1.86 and an aperture ratio of about 4.1.

Figure 5:
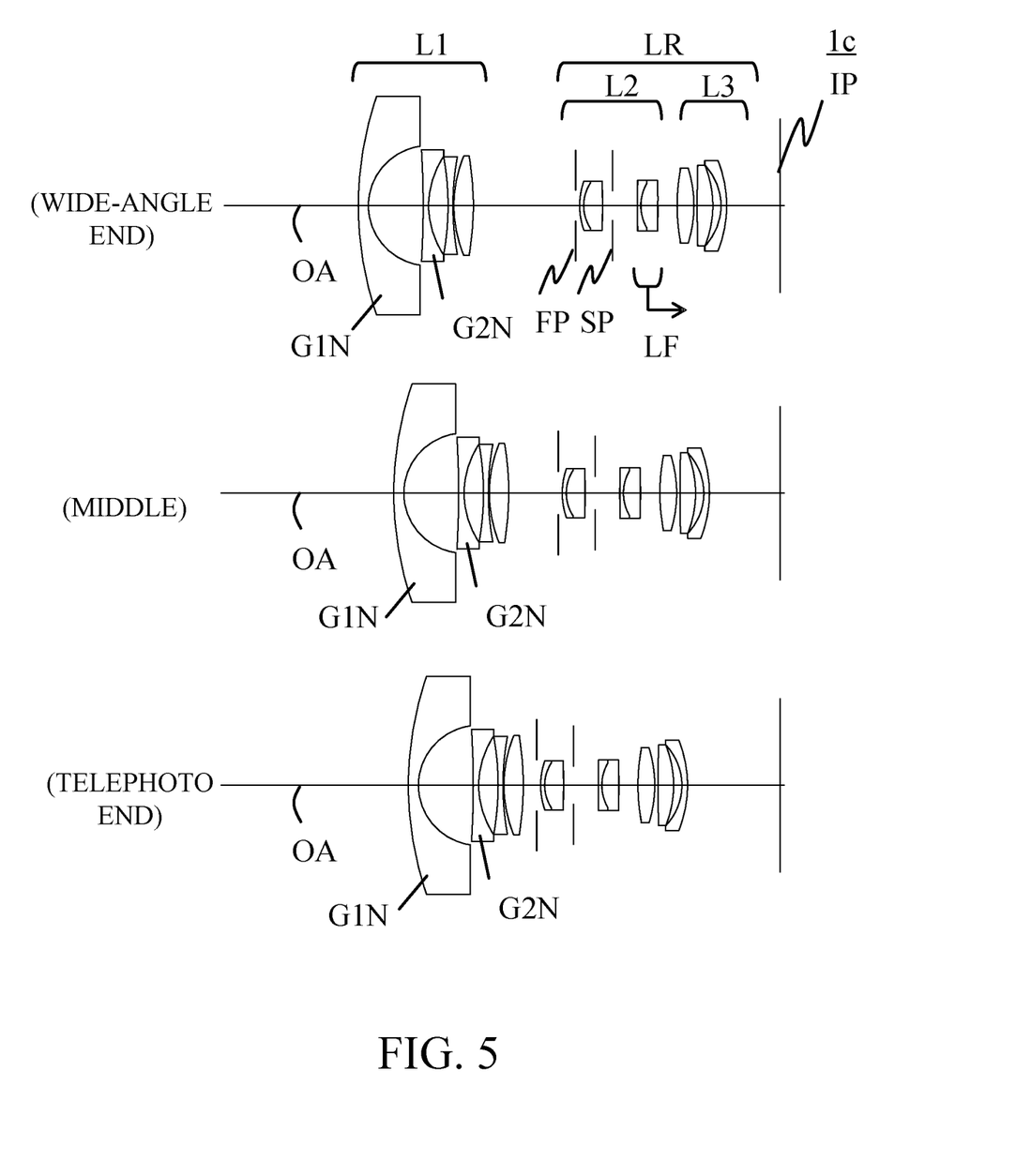
FIG. 5 is a sectional view of a zoom lens according to a third embodiment at a wide-angle end, at an intermediate zoom position, and at a telephoto end.
Figure 6A:
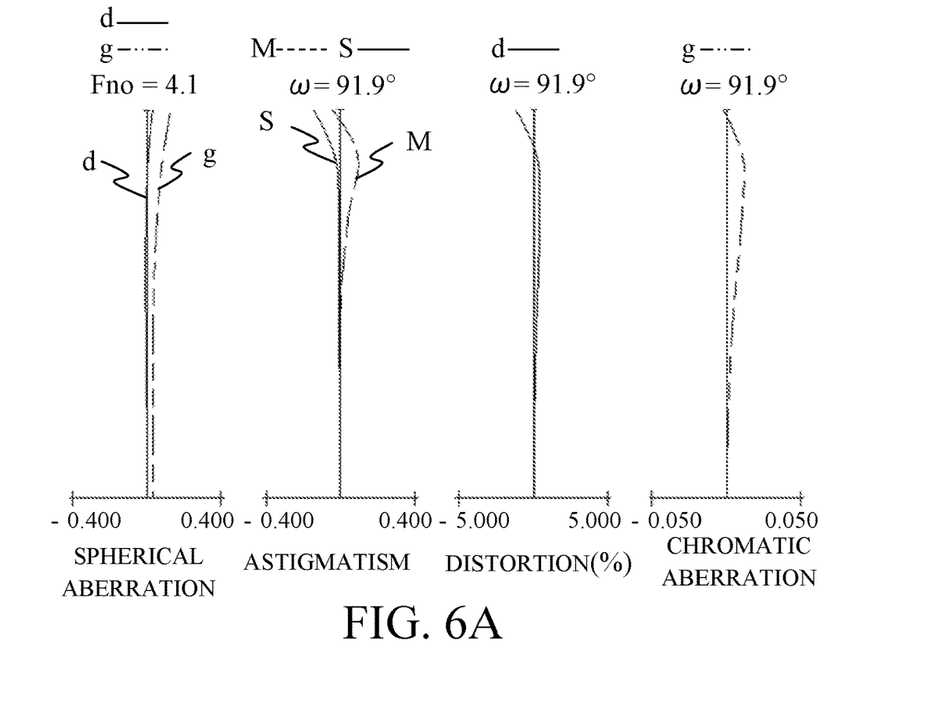
FIG. 6A is an aberration diagram of the zoom lens according to the third embodiment at the wide-angle end.
Figure 6B:
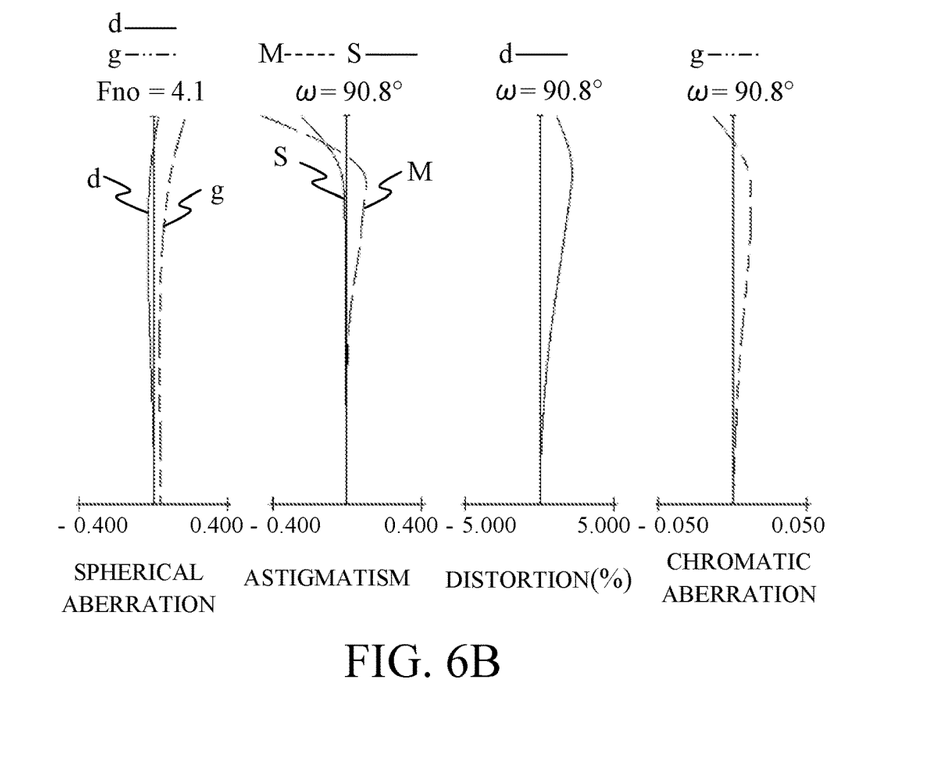
FIG. 6B is an aberration diagram of the zoom lens according to the third embodiment at the intermediate zoom position.
Figure 6C:
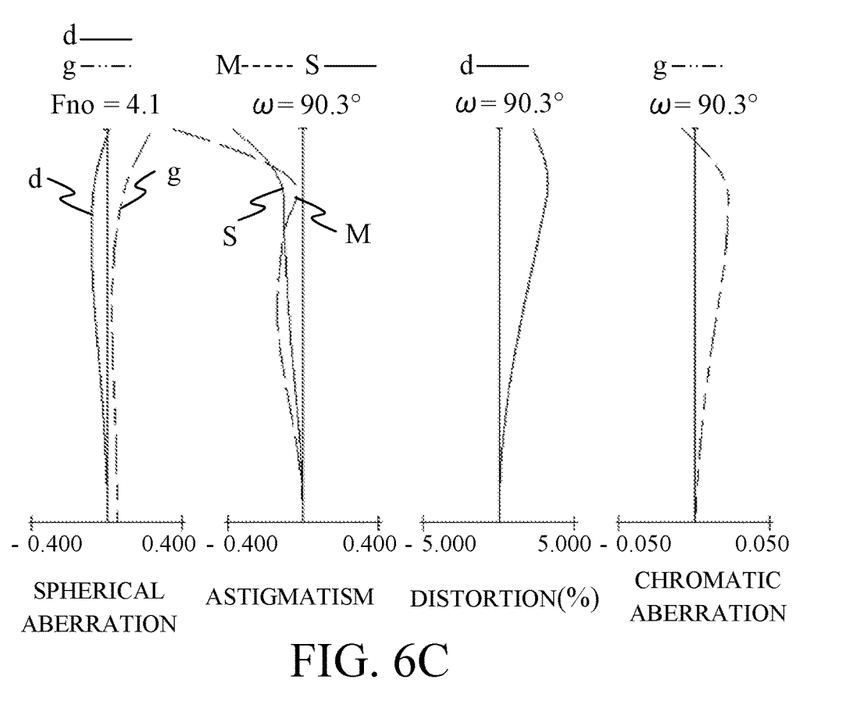
FIG. 6C is an aberration diagram of the zoom lens according to the third embodiment at the telephoto end.

FIG. 5 is a sectional view of a zoom lens 1c according to a third embodiment of the present invention at the wide-angle end, the intermediate zoom position, and the telephoto end when the object at infinity is focused. FIGS. 6A, 6B, and 6C are aberration diagrams of the zoom lens 1c at the wide-angle end, the intermediate zoom position, and the telephoto end, respectively, when the object at infinity is focused. The zoom lens 1c is a zoom lens having a zoom ratio of 1.84 and an aperture ratio of about 4.1.

The zoom lenses (optical systems) 1a to 1c according to each embodiment are imaging lens systems used for the imaging apparatuses such as digital still cameras, video cameras, surveillance cameras, and in-vehicle cameras. In FIGS. 1, 3, and 5, the left side is the object side (front) and the right side is the image side (back).

In the zoom lenses 1a and 1c according to the first and third embodiments, during zooming from the wide-angle end to the telephoto end, the first lens unit L1 moves along a locus convex toward the image side. In the zoom lenses 1a and 1c, the distance between the first lens unit L1 and the second lens unit L2 at the telephoto end is smaller than that at the wide-angle end.

In the zoom lens 1b according to the second embodiment, during zooming from the wide-angle end to the telephoto end, the first lens unit L1 moves along a locus convex toward the image side. In the zoom lens 1b, the distance between the first lens unit L1 and the second lens unit L2 at the telephoto end is smaller than that at the wide-angle end, and the distance between the second lens unit L2 and the third lens unit L3 at the telephoto end is wider than that at the wide-angle end.

In the zoom lenses 1a and 1c according to the first and third embodiments, L1 is a first lens unit having a negative refractive power (optical power=reciprocal of the focal length), L2 is a second lens unit having a positive refractive power, and L3 is a third lens unit having a positive refractive power. The rear group LR includes, in order from the object side to the image side, the second lens unit L2 and the third lens unit L3. During zooming from the wide-angle end to the telephoto end, the distance between the second lens unit L2 and the third lens unit L3 changes.

In the second embodiment, L1 is a first lens unit having a negative refractive power, L2 is a second lens unit having a negative refractive power, L3 is a third lens unit having a positive refractive power, and L4 is a fourth lens unit having a positive refractive power. The rear group LR includes, in order from the object side to the image side, the second lens unit L2, the third lens unit L3, and the fourth lens unit L4. During zooming from the wide-angle end to the telephoto end, each of the distance between the second lens unit L2 and the third lens unit L3 and the distance between the third lens unit L3 and the fourth lens unit L4 changes.

SP is a diaphragm (aperture stop) for determining (restricting) a light beam having an open F-number (Fno). FP is a flare cutting stop, which cuts off unnecessary light. When a zoom lens is used as an imaging optical system of a digital still camera or a video camera, an image plane IP corresponds to an imaging plane of a solid-state image sensor (photoelectric conversion element) such as a CCD sensor or a CMOS sensor. The image plane IP corresponds to a film plane when a zoom lens is used as an imaging optical system of a film-based camera. Arrows in FIGS. 1, 3, and 5 show movement trajectories of the respective lens units during zooming (magnification variation) from the wide-angle end to the telephoto end.

The zoom lenses 1a and 1c according to the first and third embodiments perform focusing by moving a cemented lens LF closest to the image in the second lens unit L2 along an optical axis OA. During focusing from an object at infinity to an object at a short distance, the zoom lenses 1a and 1c are retracted (toward the image side). The zoom lens 1b according to the second embodiment performs focusing by moving the second lens unit L2 along the optical axis OA. During focusing from the object at infinity to the object at the short distance, the zoom lens 1b protrudes (toward the object side).

In each aberration diagram, Fno is an F-number, co is a half angle of view (degree), and is an angle of view based on a ray trace value. In the spherical aberration diagram, a solid line is the d-line (with a wavelength 587.56 nm), and an alternate long and two short dashes line is the g-line (with a wavelength 435.8 nm). In the astigmatism, a solid line and a dotted line are a sagittal image plane and a meridional image plane at the d-line. The distortion is shown for the d-line. In the magnification chromatic aberration diagram, an alternate long and two short dashes line is the g-line. In each embodiment, the wide-angle end and the telephoto end refer to zoom positions when the lens units for magnification variations are mechanically located at both ends of a movable range on the optical axis.

In the zoom lens according to each embodiment, the projection system according to the first to third embodiments employs an equisolid angle projection system ($Y=2\cdot f\cdot\sin(\theta/2)$). In the fisheye lens according to each embodiment, the projection method is not limited to the equisolid angle projection, and another projection method may be used.

The zoom lenses 1a to 1c according to the respective embodiments include, in order from the object side to the image side, a first lens unit L1 having a negative refractive power and a rear lens unit LR including at least one lens unit and having a positive refractive power as a whole. During zooming from the wide-angle end to the telephoto end, the distance between the first lens unit L1 and the rear group LR (the distance between adjacent lens units) changes. Further, the overall optical length at the telephoto end (the length from the lens surface closest to the object side to the image surface in each of the zoom lenses 1a to 1c according to each embodiment) is shorter than that at the wide-angle end. In other words, the distance on the optical axis from the lens surface closest to the object side to the image plane of the zoom lens at the telephoto end is shorter than the distance on the optical axis from the lens surface closest to the object side to the image plane of the zoom lens at the wide-angle end. Further, the first lens unit L1 has at least three negative lenses (at least three negative lenses may be continuously disposed). The following conditional expression (1) and (2) are satisfied where f1 is a focal length of the first lens unit, fw is a focal length of the zoom lens at the wide-angle end, and fG1N is a focal length of the negative lens G1N closest to the object side in the first lens unit:

$$1.93<|f1|/fw<6.50 \tag{1}$$

$$0.10<fG1N/f1<2.00 \tag{2}$$

As the overall length of the lens is made smaller and the size of the entire optical system is reduced, various aberrations, particularly a chromatic aberration such as the lateral chromatic aberration, increases, and the optical performance tends to lower. In particular, in a retrofocus type optical system designed to reduce the overall length of the lens, a front unit (first lens unit L1) having a negative refractive power is likely to become larger and it is important to have an appropriate configuration of the front unit and the proper refractive power arrangement.

The conditional expression (1) is a conditional expression in which the focal length f1 of the first lens unit L1 is defined by the focal length fw of the zoom lens at the wide-angle end, and is to correct the lateral chromatic aberration and field curvature while suppressing the distortion. The value higher than the upper limit in the conditional expression (1) is advantageous to the aberration correction, but has difficulties in realizing both a wider angle and a small size, causing a larger diameter of the front lens and a larger optical system. On the other hand, when the value is lower than the lower limit in the conditional expression (1), the refractive power of the first lens unit L1 becomes strong, the image height change of the off-axis coma aberration becomes large, and it is difficult to correct the field curvature and astigmatism.

The conditional expression (2) is a conditional expression in which the focal length fG1N of the negative lens G1N closest to the object side in the first lens unit L1 is defined by the focal length f1 of the first lens unit L1. When the value higher than the upper limit in the conditional expression (2) is advantageous for correcting the lateral chromatic aberration, but causes a larger diameter of the front lens. On the other hand, when the value is lower than the lower limit in the conditional expression (2), it becomes difficult to correct the curvature of field and distortion, which may increase the number of lenses and the overall length of the lens.

In the zoom lenses 1a to 1c of the respective embodiments, each element is properly set so as to satisfy the conditional expressions (1) and (2). This configurations can provide a compact zoom lens (optical system) having well-corrected aberration such as the chromatic aberration.

Each embodiment may set the numerical ranges of the conditional expressions (1) and (2) as in the following conditional expressions (1a) and (2a).

$$1.94 < |f1|/fw < 6.00 \quad (1a)$$

$$0.50 < fG1N/f1 < 1.80 \quad (2a)$$

Satisfying the conditional expression (1a) can facilitate the correction of the aberrations due to the wider angle. Satisfying the conditional expression (2a) can facilitate the corrections of both the lateral chromatic aberration and the distortion.

Each embodiment may set the numerical ranges of the conditional expressions (1a) and (2a) as in the following conditional expressions (1b) and (2b).

$$1.95 < |f1|/fw < 5.40 \quad (1b)$$

$$0.55 < fG1N/f1 < 1.70 \quad (2b)$$

By thus properly setting the unit configuration and simultaneously satisfying the conditional expressions (1) and (2), a zoom lens can be realized which has good optical performance over the entire zoom range from the wide-angle end to the telephoto end, and a super wide-angle range having an angle of view exceeding 100° at the wide-angle end.

Each embodiment may satisfy at least one of the following conditional expressions (3) to (8). Now assume that ndLN is a refractive index of the negative lens LN closest to the image side among the negative lenses included in the rear group LR. The negative lens LN may be the lens closest to the image in the rear group LR. TDw and TDt, respectively, are lengths on the optical axis (overall lens lengths) from the lens surface closest to the object side (vertex of the lens surface) to the lens surface closest to the image of the zoom lens at the wide-angle end and the telephoto end. When an object at infinity is focused (where the infinite-distance object is focused), Skw is a distance (backfocus in the air conversion) from the lens surface closest to the image side to the image surface of the zoom lens at the wide-angle end. The first lens unit L1 has a negative lens G2N arranged adjacent to the image side of the negative lens G1N, and fG2N is a focal length of the negative lens G2N. fRw is a focal length of the rear group LR at the wide-angle end when the object at infinity is focused. βRw is a lateral magnification of the rear group LR at the wide-angle end when the object at infinity is focused.

$$1.80 < ndLN < 2.20 \quad (3)$$

$$0.5 < TDt/TDw < 0.9 \quad (4)$$

$$0.5 < SKw/fw < 2.0 \quad (5)$$

$$0.5 < fG1N/fG2N < 1.0 \quad (6)$$

$$-2.5 < f1/fRw < -0.3 \quad (7)$$

$$-0.7 < \beta Rw < -0.1 \quad (8)$$

The conditional expression (3) defines the refractive index of the negative lens LN located closest to the image side among the negative lenses in the rear group LR. Due to the glass properties, as the refractive index increases, the Abbe number decreases, causing an insufficient correction of the lateral chromatic aberration. Thus, if the desired chromatic aberration is to be suppressed, the refractive power must be reduced and the overall length of the lens may increase. In the retrofocus type lens, when the number of components is reduced and the size is reduced, the Petzval sum tends to be a negative value, the image plane may fall to the overexposure side, and the astigmatic difference may increase. It is thus important to optimize the refractive index of the negative lens and to satisfactorily correct the field curvature and astigmatism.

When the value is higher than the upper limit in the conditional expression (3), it is advantageous for correcting the image plane, but it is difficult to correct both the distortion and the lateral chromatic aberration. On the other hand, when the value is lower than the lower limit in the conditional expression (3), it is necessary to weaken the refractive power of the negative lens in order to correct the curvature of field, and as a result, the backfocus may disadvantageously increase.

The conditional expression (4) is a conditional expression in which the overall lens length TDt at the telephoto end is defined by the overall lens length TDw at the wide-angle end, and defines a condition to optimize the size of the zoom lens and the magnification variation distribution, and to properly correct the zoom fluctuation of the field curvature. When the value is higher than the upper limit in the conditional expression (4), the size of the entire optical system increases, and correction of the off-axis aberration and coma flare in the sagittal direction become incorrect. On the other hand, when the value is lower than the lower limit in the conditional expression (4), the overall length of the lens at the wide-angle end increases, and the diameter of the front lens may disadvantageously increase.

The conditional expression (5) is an expression that defines the backfocus SKw at the wide-angle end by the focal length fw of the zoom lens, and defines a so-called retro ratio. When the value is higher than the upper limit in the conditional expression (5), the backfocus becomes long, it becomes difficult to correct the distortion and the curvature of field, and the number of lenses increases. On the other hand, when the value is lower than the lower limit of the conditional expression (5), the backfocus becomes short, and the arrangement of the shutter member and the like becomes difficult.

The conditional expression (6) is a conditional expression defining the refractive power distribution of the negative lenses G1N and G2N. In order to provide a smaller zoom lens with a wider angle, two negative lenses are arranged in order from the object side and the refractive power distribution is defined. When the value is higher than the upper limit in the conditional expression (6), the refractive power of the negative lens G1N closest to the object side becomes weak, which causes a larger diameter of the front lens. On the other hand, when the value is lower than the lower limit in the conditional expression (6), the refractive power of the negative lens G1N closest to the object side becomes strong, which is advantageous for miniaturization, but it becomes difficult to correct the field curvature and astigmatism.

The conditional expression (7) is a conditional expression in which the focal length f1 of the first lens unit L1 having the negative refractive power is defined by the focal length fRw of the rear group LR having the positive refractive power at the wide-angle end. When the value is higher than the upper limit in the conditional expression (7), the negative refracting power of the first lens unit L1 is strong, the divergence of the marginal ray becomes large, and it becomes difficult to correct the spherical aberration and coma in the rear group LR. On the other hand, when the value is lower than the lower limit in the conditional expression (7), the positive refractive power of the rear group LR becomes strong, the convergence of the rear group becomes large, and it becomes difficult to suppress both the secondary spectra of the lateral chromatic aberration and the longitudinal chromatic aberration.

The conditional expression (8) defines the lateral magnification of the rear group at the wide-angle end, and a condition for suppressing changes in curvature of field during zooming. The value higher than the upper limit in the conditional expression (8) is advantageous for correcting the distortion and the lateral chromatic aberration, but it becomes difficult to reduce the overall length of the lens at the wide-angle end, the first lens unit L1 must be disposed farther from the diaphragm SP, and the height of the light beam of the first lens unit L1 and the diameter increase. On the other hand, when the value is lower than the lower limit in the conditional expression (8), the positive refractive power of the rear group LR and the convergence of the rear group increase, and it becomes difficult to suppress the secondary spectra of the lateral and longitudinal chromatic aberrations caused by the zooming fluctuation.

The imaging apparatus 10 has an image sensor 12 that receives an image formed by the zoom lenses 1a to 1c according to each embodiment at the wide-angle end, as described later. Where ωw is a half angle of view (degree) when the object at infinity is focused at the wide angle end, the following conditional expression (9) may be satisfied. The half angle of view in the conditional expression (9) is a half angle of view when the outermost circumference of the image circle is set to the maximum image height. The outermost circumference of the image circle is a position where the light amount is 10% as large as that at the center position on the image plane when a uniform light source is projected onto the image plane via the zoom lens according to each embodiment.

$$80 < \omega w < 100 \tag{9}$$

When the value is higher than the upper limit in the conditional expression (9) and the maximum half angle of view increases, the image compression at each angle of view increases, and it becomes difficult to obtain a sufficient resolving power. On the other hand, when the value is lower than the lower limit in the conditional expression (9), the angle of view required for a fisheye zoom lens or a super wide-angle zoom lens cannot be obtained.

Each embodiment may set the numerical ranges of the conditional expressions (3) to (9) as in the following conditional expressions (3a) to (9a).

$$1.83 < ndLN < 2.15 \tag{3a}$$

$$0.70 < TDt/TDw < 0.85 \tag{4a}$$

$$0.8 < SKw/fw < 1.7 \tag{5a}$$

$$0.55 < fG1N/fG2N < 0.80 \tag{6a}$$

$$-2.3 < f1/fRw < -0.4 \tag{7a}$$

$$-0.60 < \beta Rw < -0.12 \tag{8a}$$

$$85 < \omega w < 95 \tag{9a}$$

Each embodiment may set the numerical ranges of the conditional expressions (3a) to (9a) as in the following conditional expressions (3b) to (9b).

$$1.85 < ndLN < 2.10 \tag{3b}$$

$$0.73 < TDt/TDw < 0.80 \tag{4b}$$

$$1.2 < SKw/fw < 1.7 \tag{5b}$$

$$0.6 < fG1N/fG2N < 0.7 \tag{6b}$$

$$-2.1 < f1/fRw < -0.5 \tag{7b}$$

$$-0.40 < \beta Rw < -0.15 \tag{8b}$$

$$88 < \omega w < 92 \tag{9b}$$

In the zoom lens according to each embodiment, at least one of the negative lenses included in the first lens unit L1 may have a biconcave shape. While a predetermined refractive power is secured, a lens having a meniscus shape has a limit in the refractive power that can be realized as a single lens, and it is difficult to maintain the shape. Therefore, the refractive power can be made higher by forming the biconcave shape. This configuration can reduce the number of lenses constituting the first lens unit L1 or suppress the thickness of the first lens unit L1 (on the optical axis or around the effective diameter). In order to reduce the diameter of the front lens (diameter of the lens disposed closest to the object side) with a wider angle of view of the zoom lens, this biconcave negative lens may be a negative lens counted from the object side in the second and subsequent lenses.

In the zoom lens according to each embodiment, among the distances between adjacent lenses in the first lens unit L1, the distance between the negative lens G1N (negative lens disposed closest to the object side) and the negative lens G2N (adjacent to the negative lens G1N on the image side) may be the widest. Thereby, the zoom lens can be made compact with a wide angle of view.

In the zoom lens according to each embodiment, the lens surfaces (the object-side lens surface and the image-side lens surface) of the negative lens G1N may have meniscus shapes having spherical surfaces convex toward the object side. Thereby, it becomes easy to manufacture a zoom lens with required optical performance. All the lenses included in the first lens unit L1 may be spherical lenses for easy manufacture.

In the zoom lens according to each embodiment, the refractive index of the negative lens G1N (negative lens disposed closest to the object side) for the d-line may be larger than that of the negative lens G2N (negative lens disposed adjacent to the negative lens G1N on the image side). In a wide-angle lens, the off-axis ray spreads to the object side of the diaphragm. In order to reduce the lens diameter while maintaining a predetermined angle of view, it is effective to increase the refractive power of the negative lens closest to the object side. Thus, a higher refractive power of the negative lens G1N can achieve both a wide angle of view and a compact overall system. For a wider angle of view, this configuration can make smaller the overall system while suppressing various aberrations such as the field curvature and the astigmatism which would be generated in the lens G1N.

A description will now be given of numerical examples 1 to 3 corresponding to first to third embodiments. Each example can obtain a zoom lens with high imaging performance by properly setting the configuration, the material selection, and the refractive power arrangement of each lens unit. In each numerical example, ri is a radius of curvature of an i-th surface in order from the object side, di is a sum of a lens thickness and an air gap between the i-th surface and (i+1)-th surface in order from the object side, and ndi and vdi are a refractive index and an Abbe number of the material of the i-th optical element in order from the object side. Table 1 shows a relationship between the above conditional expressions and first to third embodiments. f is a focal length, Fno is an F-number, ω is a half angle of view (degree), and indicates an angle of view by ray tracing.

Numerical Example 1

| UNIT: mm | | | |
|---|---|---|---|
| SURFACE DATA | | | |
| SURFACE NUMBER | r | d | nd | vd |
|---|---|---|---|---|
| 1 | 69.116 | 2.50 | 1.76385 | 48.5 |
| 2 | 14.876 | 16.64 | | |
| 3 | −92.951 | 1.35 | 1.53775 | 74.7 |
| 4 | 25.720 | 5.46 | | |
| 5 | −62.493 | 1.20 | 1.88300 | 40.8 |
| 6 | 49.394 | 0.24 | | |
| 7 | 32.654 | 5.53 | 1.85025 | 30.1 |
| 8 | −67.052 | (VARIABLE) | | |
| 9 | ∞ | 1.00 | | |
| 10 | 60.170 | 2.10 | 1.48749 | 70.2 |
| 11 | −179.760 | 0.20 | | |
| 12 | 18.726 | 1.00 | 1.95375 | 32.3 |
| 13 | 12.140 | 4.15 | 1.51742 | 52.4 |
| 14 | 112.245 | 2.50 | | |
| 15(DIAPHRAGM) | ∞ | 7.69 | | |
| 16 | 202.105 | 0.90 | 1.67300 | 38.3 |
| 17 | 13.616 | 5.39 | 1.76385 | 48.5 |
| 18 | −483.548 | (VARIABLE) | | |
| 19 | 40.721 | 5.20 | 1.43700 | 95.1 |
| 20 | −55.177 | 0.30 | | |
| 21 | 104.194 | 7.53 | 1.43700 | 95.1 |
| 22 | −17.208 | 1.20 | 1.88300 | 40.8 |
| 23 | −33.706 | 2.13 | | |
| 24 | −19.687 | 1.40 | 2.00100 | 29.1 |
| 25 | −27.835 | (VARIABLE) | | |
| IMAGE PLANE | ∞ | | | |

| VARIOUS DATA | | | |
|---|---|---|---|
| ZOOM RATIO 1.85 | | | |
| | WIDE-ANGLE | MIDDLE | TELEPHOTO |
| FOCAL LENGTH | 8.10 | 12.51 | 15.01 |
| Fno | 4.10 | 4.10 | 4.10 |
| HALF VIEW ANGLE | 90.14 | 90.45 | 90.39 |
| IMAGE HEIGHT | 11.50 | 18.00 | 21.60 |
| OVERALL LENS LENGTH | 123.74 | 111.21 | 109.67 |
| BF | 11.78 | 20.27 | 24.66 |
| d 8 | 30.21 | 10.77 | 4.99 |
| d18 | 6.14 | 4.56 | 4.41 |
| d25 | 11.78 | 20.27 | 24.66 |

| ZOOM LENS UNIT DATA | | |
|---|---|---|
| UNIT | START SURFACE | FOCAL LENGTH |
| 1 | 1 | −15.81 |
| 2 | 9 | 33.42 |
| 3 | 19 | 88.81 |

Numerical Example 2

| UNIT: mm | | | |
|---|---|---|---|
| SURFACE DATA | | | |
| SURFACE NUMBER | r | d | nd | vd |
|---|---|---|---|---|
| 1 | 69.371 | 2.50 | 1.76385 | 48.5 |
| 2 | 14.745 | 14.38 | | |
| 3 | 263.184 | 1.35 | 1.53775 | 74.7 |
| 4 | 20.476 | 5.83 | | |
| 5 | −39.045 | 1.20 | 1.59282 | 68.6 |
| 6 | 33.526 | 0.24 | | |
| 7 | 26.797 | 6.12 | 1.85025 | 30.1 |
| 8 | −37.028 | (VARIABLE) | | |
| 9 | −25.901 | 1.30 | 1.91082 | 35.3 |
| 10 | −122.028 | (VARIABLE) | | |
| 11 | ∞ | 1.00 | | |
| 12 | 24.286 | 2.50 | 1.48749 | 70.2 |
| 13 | −95.780 | 0.20 | | |
| 14 | 20.038 | 1.00 | 1.95375 | 32.3 |
| 15 | 11.039 | 3.62 | 1.51742 | 52.4 |
| 16 | 231.303 | 2.50 | | |
| 17(DIAPHRAGM) | ∞ | 6.09 | | |
| 18 | 1764.677 | 0.90 | 1.67300 | 38.3 |
| 19 | 15.325 | 3.96 | 1.76385 | 48.5 |
| 20 | −112.119 | (VARIABLE) | | |
| 21 | 53.370 | 3.77 | 1.43700 | 95.1 |
| 22 | −76.916 | 0.30 | | |
| 23 | −276.683 | 6.34 | 1.43700 | 95.1 |
| 24 | −16.095 | 1.20 | 1.88300 | 40.8 |
| 25 | −21.730 | 0.94 | | |
| 26 | −17.489 | 1.40 | 1.88300 | 40.8 |
| 27 | −24.438 | (VARIABLE) | | |
| IMAGE PLANE | ∞ | | | |

| VARIOUS DATA | | | |
|---|---|---|---|
| ZOOM RATIO 1.86 | | | |
| | WIDE-ANGLE | MIDDLE | TELEPHOTO |
| FOCAL LENGTH | 8.10 | 11.97 | 15.07 |
| Fno | 4.10 | 4.10 | 4.10 |
| HALF VIEW ANGLE | 91.51 | 90.00 | 90.32 |
| IMAGE HEIGHT | 11.50 | 17.00 | 21.50 |
| OVERALL LENS LENGTH | 111.33 | 107.33 | 108.91 |
| BF | 13.13 | 24.44 | 31.63 |
| d 8 | 3.88 | 3.84 | 3.41 |
| d10 | 17.92 | 6.25 | 1.70 |
| d20 | 7.77 | 4.16 | 3.54 |
| d27 | 13.13 | 24.44 | 31.63 |

-continued

UNIT: mm

ZOOM LENS UNIT DATA

| UNIT | START SURFACE | FOCAL LENGTH |
|---|---|---|
| 1 | 1 | −43.70 |
| 2 | 9 | −36.33 |
| 3 | 11 | 25.67 |
| 4 | 21 | 83.24 |

Numerical Example 3

UNIT: mm

SURFACE DATA

| SURFACE NUMBER | r | d | nd | νd |
|---|---|---|---|---|
| 1 | 83.873 | 2.50 | 1.76385 | 48.5 |
| 2 | 14.974 | 13.68 | | |
| 3 | −230.641 | 1.35 | 1.53775 | 74.7 |
| 4 | 22.011 | 4.85 | | |
| 5 | −68.215 | 1.20 | 1.88300 | 40.8 |
| 6 | 67.659 | 0.24 | | |
| 7 | 32.480 | 4.86 | 1.78880 | 28.4 |
| 8 | −72.841 | (VARIABLE) | | |
| 9 | ∞ | 1.00 | | |
| 10 | 18.484 | 1.00 | 1.95375 | 32.3 |
| 11 | 10.327 | 4.70 | 1.61772 | 49.8 |
| 12 | −156.686 | 2.50 | | |
| 13(DIAPHRAGM) | ∞ | 6.15 | | |
| 14 | 194.627 | 0.90 | 1.67300 | 38.1 |
| 15 | 11.192 | 4.23 | 1.76385 | 48.5 |
| 16 | −209.302 | (VARIABLE) | | |
| 17 | 49.010 | 4.20 | 1.43875 | 94.7 |
| 18 | −31.263 | 0.80 | | |
| 19 | 306.566 | 3.91 | 1.43875 | 94.7 |
| 20 | −26.719 | 2.06 | | |
| 21 | −14.575 | 1.40 | 2.00100 | 29.1 |
| 22 | −30.176 | (VARIABLE) | | |
| IMAGE PLANE | ∞ | | | |

VARIOUS DATA
ZOOM RATIO 1.84

| | WIDE-ANGLE | MIDDLE | TELEPHOTO |
|---|---|---|---|
| FOCAL LENGTH | 8.10 | 11.12 | 14.90 |
| Fno | 4.10 | 4.10 | 4.10 |
| HALF VIEW ANGLE | 91.88 | 90.77 | 90.31 |
| IMAGE HEIGHT | 11.50 | 16.00 | 21.60 |
| OVERALL LENS LENGTH | 105.16 | 96.32 | 92.68 |
| BF | 13.32 | 17.61 | 23.08 |
| d 8 | 25.51 | 12.33 | 3.31 |
| d16 | 4.80 | 4.85 | 4.77 |
| d22 | 13.32 | 17.61 | 23.08 |

ZOOM LENS UNIT DATA

| UNIT | START SURFACE | FOCAL LENGTH |
|---|---|---|
| 1 | 1 | −16.58 |
| 2 | 9 | 29.47 |
| 3 | 17 | 97.97 |

TABLE 1

| | 1st EMBODIMENT | 2nd EMBODIMENT | 3rd EMBODIMENT |
|---|---|---|---|
| fw | 8.100 | 8.100 | 8.100 |
| ft | 15.012 | 15.065 | 14.905 |
| f1 | −15.813 | −43.696 | −16.582 |
| fRw | 27.727 | 21.424 | 26.289 |
| TDw | 111.958 | 98.197 | 91.842 |
| TDt | 85.011 | 77.281 | 69.603 |
| skw | 11.785 | 13.129 | 13.317 |
| skt | 24.656 | 31.626 | 23.080 |
| fG1N | −25.322 | −25.009 | −24.245 |
| fG2N | −37.314 | −41.371 | −37.296 |
| β2w | −0.765 | 0.249 | −0.711 |
| β3w | 0.670 | −0.976 | 0.687 |
| β4w | — | 0.764 | — |
| βRw | −0.512 | −0.185 | −0.488 |
| LDw | 123.743 | 111.326 | 105.159 |
| LDt | 109.667 | 108.907 | 92.683 |
| (1)|f1|/fw | 1.952 | 5.395 | 2.047 |
| (2)fG1N/f1 | 1.601 | 0.572 | 1.462 |
| (3)ndLN | 2.00100 | 1.88300 | 2.00100 |
| (4)TDt/TDw | 0.759 | 0.787 | 0.758 |
| (5)SKw/fw | 1.455 | 1.621 | 1.644 |
| (6)fG1N/fG2N | 0.679 | 0.605 | 0.650 |
| (7)f1/fRw | −0.570 | −2.040 | −0.631 |
| (8)βRw | −0.512 | −0.185 | −0.488 |
| (9)ωw | 90.14 | 91.51 | 91.88 |

Figure 7:
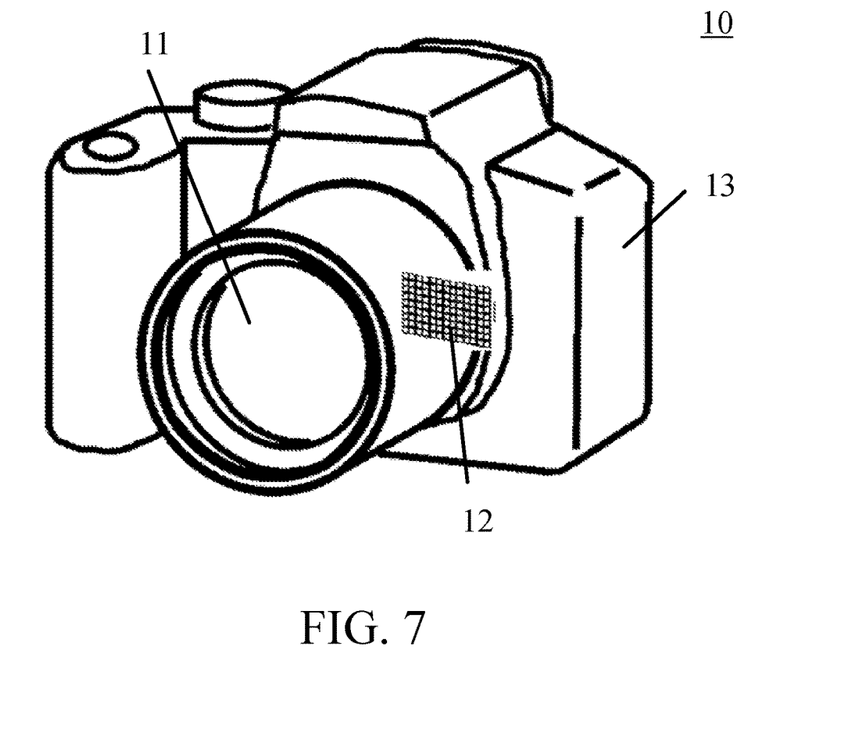
FIG. 7 is a schematic diagram of an imaging apparatus including the zoom lens according to each embodiment.

Referring now to FIG. 7, a description will be given of an illustrative digital still camera (imaging apparatus 10) using a zoom lens according to each embodiment for an imaging optical system. FIG. 7 is a schematic diagram of the imaging apparatus 10 including the zoom lens according to each embodiment.

In FIG. 7, reference numeral 13 denotes a camera body, and reference numeral 11 denotes an imaging optical system including any of the zoom lenses 1a to 1c described in the first to third embodiments. Reference numeral 12 denotes the solid-state image sensor (photoelectric conversion device), such as a CCD sensor and a CMOS sensor, which receives an optical image formed by the imaging optical system 11 and performs a photoelectric conversion. The camera body 13 may be a so-called single-lens reflex camera having a quick turn mirror or a so-called mirrorless camera having no quick turn mirror. The zoom lenses 1a to 1c according to these embodiments can be used as a projection optical system for a projection apparatus (projector).

Each embodiment can realize a zoom lens with a wide angle of view, a compact overall lens system, and high optical performance, and various well-corrected aberrations such as the spherical aberration, the coma, and the field curvature. Hence, each embodiment can provide a compact zoom lens having a wide angle of view and high optical performance, and an imaging apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This Applications claims the benefit of Japanese Patent Application No. 2019-066984, filed on Mar. 29, 2019, and Japanese Patent Application No. 2019-227718, filed on Dec. 17, 2019, each of which is hereby incorporated by reference herein in their entirety.

What is claimed is:

1. A zoom lens comprising, in order from an object side to an image side, a first lens unit having a negative refractive power, and a rear group having a positive refractive power as a whole including at least one lens unit, wherein during zooming from a wide-angle end to a telephoto end, a distance between adjacent lens units changes, wherein the first lens unit includes at least three negative single lenses, and wherein the following conditional expressions are satisfied:

$$1.93 < |f1|/fw < 6.50,$$

$$0.10 < fG1N/f1 < 2.00, \text{ and}$$

$$1.80 < ndLN < 2.20,$$

Where f1 is a focal length of the first lens unit, fw is a focal length of the zoom lens at the wide-angle end, fG1N is a focal length of a negative lens G1N closest to the object side in the first lens unit, and ndLN is a refractive index of a negative lens LN disposed closest to the image side among the negative lenses included in the rear group.

2. The zoom lens according to claim 1, wherein a distance on an optical axis from a lens surface closest to the object side to an image plane of the zoom lens at the telephoto end is shorter than that on the optical axis from the lens surface closest to the object side to the image plane of the zoom lens at the wide-angle end.

3. The zoom lens according to claim 1, wherein the rear group includes, in order from the object side to the image side, a second lens unit having a positive refractive power and a third lens unit having a positive refractive power.

4. The zoom lens according to claim 1, wherein the negative lens LN is disposed closest to the image side in the rear group.

5. The zoom lens according to claim 1, wherein the following conditional expression is satisfied:

$$0.5 < TDt/TDw < 0.9,$$

where TDw and TDt are lengths on an optical axis from a lens surface closest to the object side to a lens surface closest to the image side of the zoom lens at the wide-angle end and the telephoto end, respectively.

6. The zoom lens according to claim 1, wherein the following conditional expression is satisfied:

$$0.5 < SKw/fw < 2.0,$$

where SKw is a distance from a lens surface closest to the image side to an image surface of the zoom lens at the wide-angle end when an object at infinity is focused.

7. The zoom lens according to claim 1, wherein the first lens unit includes a negative lens G2N disposed adjacent to the image side of the negative lens G1N, and wherein the following conditional expression is satisfied:

$$0.5 < fG1N/fG2N < 1.0,$$

where fG2N is a focal length of the negative lens G2N.

8. The zoom lens according to claim 1, wherein the first lens unit includes the at least three negative lenses continuously disposed from the object side to the image side.

9. The zoom lens according to claim 1, wherein the following conditional expression is satisfied:

$$-2.5 < f1/fRw < -0.3,$$

where fRw is a focal length in the rear group at the wide-angle end when an object at infinity is focused.

10. The zoom lens according to claim 1, wherein the following conditional expression is satisfied:

$$-0.7 < \beta Rw < -0.1,$$

where $\beta Rw$ is a lateral magnification of the rear group at the wide-angle end when an object at infinity is focused.

11. The zoom lens according to claim 1, wherein at least one of the negative lenses included in the first lens unit has a biconcave shape.

12. The zoom lens according to claim 11, wherein at least one of second and subsequent negative lenses counted from the object side among the negative lenses included in the first lens unit has a biconcave shape.

13. The zoom lens according to claim 1, wherein the first lens unit includes a negative lens G2N disposed adjacent to the image side of the negative lens G1N, and wherein among distances between adjacent lenses in the first lens unit, a distance between the negative lens G1N and the negative lens G2N is the widest.

14. The zoom lens according to claim 1, wherein the negative lens G1N has a meniscus shape convex to the object side, in which both an object-side lens surface and an image-side lens surface are spherical.

15. The zoom lens according to claim 1, wherein all lenses included in the first lens unit are spherical lenses.

16. The zoom lens according to claim 1, wherein the first lens unit includes a negative lens G2N disposed adjacent to the image side of the negative lens G1N, and wherein a refractive index of the negative lens G1N is larger than that of the negative lens G2N.

17. An imaging apparatus comprising:

a zoom lens; and an image sensor configured to receive an image formed by the zoom lens, wherein the zoom lens includes, in order from an object side to an image side, a first lens unit having a negative refractive power, and a rear group having a positive refractive power as a whole including at least one lens unit, wherein during zooming from a wide-angle end to a telephoto end, a distance between adjacent lens units changes, wherein the first lens unit includes at least three negative single lenses, and wherein the following conditional expressions are satisfied:

$$1.93 < |f1|/fw < 6.50,$$

$$0.10 < fG1N/f1 < 2.00, \text{ and}$$

$$1.80 < ndLN < 2.20,$$

where f1 is a focal length of the first lens unit, fw is a focal length of the zoom lens at the wide-angle end, fG1N is a focal length of a negative lens G1N closest to the object side in the first lens unit, and ndLN is a refractive index of a negative lens LN disposed closest to the image side among the negative lenses included in the rear group.

18. A zoom lens comprising, in order from an object side to an image side, a first lens unit having a negative refractive power, and a rear group having a positive refractive power as a whole including at least one lens unit, wherein during zooming from a wide-angle end to a telephoto end, a distance between adjacent lens units changes, wherein the first lens unit includes at least three negative single lenses, wherein the rear group includes, in order from the object side to the image side, a second lens unit having a negative refractive power, a third lens unit having a positive refractive power, and a fourth lens unit having a positive refractive power, and wherein the following conditional expressions are satisfied:

$$1.93 < |f1|/fw < 6.50, \text{ and}$$

$$0.10 < fG1N/f1 < 2.00,$$

where f1 is a focal length of the first lens unit, fw is a focal length of the zoom lens at the wide-angle end, and fG1N is a focal length of a negative lens G1N closest to the object side in the first lens unit.

19. A zoom lens comprising, in order from an object side to an image side, a first lens unit having a negative refractive power, and a rear group having a positive refractive power as a whole including at least one lens unit, wherein during zooming from a wide-angle end to a telephoto end, a distance between adjacent lens units changes, wherein the first lens unit includes at least three negative single lenses, and wherein the following conditional expressions are satisfied:

$$1.93|f1|/fw < 6.50,$$

$$0.10 < fG1N/f1 < 2.00, \text{ and}$$

$$80 < \omega w < 100,$$

where f1 is a focal length of the first lens unit, fw is a focal length of the zoom lens at the wide-angle end, fG1N is a focal length of a negative lens G1N closest to the object side in the first lens unit, and ωw (degree) is a half angle of view when an object at infinity is focused at the wide-angle end.

* * * * *